United States Patent
Krantz

(10) Patent No.: US 7,212,014 B2
(45) Date of Patent: May 1, 2007

(54) STUD SENSOR WITH FLOATING HEAD

(75) Inventor: Norman L. Krantz, San Jose, CA (US)

(73) Assignee: Zircon Corporation, Campbell, CA (US)

( * ) Notice: Subject to any disclaimer, the term of this patent is extended or adjusted under 35 U.S.C. 154(b) by 81 days.

(21) Appl. No.: 11/055,879

(22) Filed: Feb. 11, 2005

(65) Prior Publication Data
US 2005/0200368 A1   Sep. 15, 2005

Related U.S. Application Data

(60) Provisional application No. 60/551,857, filed on Mar. 9, 2004.

(51) Int. Cl.
*G01R 27/26* (2006.01)

(52) U.S. Cl. .................................................. 324/661

(58) Field of Classification Search .................. None
See application file for complete search history.

(56) References Cited

U.S. PATENT DOCUMENTS

| | | | |
|---|---|---|---|
| 3,469,157 A | 9/1969 | Rhodes | |
| 4,099,118 A * | 7/1978 | Franklin et al. | 324/671 |
| 4,415,792 A * | 11/1983 | Jordan | 219/98 |
| 4,464,622 A | 8/1984 | Franklin | |
| 4,853,617 A | 8/1989 | Douglas et al. | |
| 5,917,314 A | 6/1999 | Heger et al. | |
| 6,023,159 A | 2/2000 | Heger | |
| 6,894,508 B2 | 5/2005 | Sanoner et al. | |
| 2003/0227389 A1 * | 12/2003 | McGreal et al. | 340/628 |
| 2004/0107850 A1 * | 6/2004 | Hughes | 101/327 |
| 2004/0255477 A1 * | 12/2004 | Levine et al. | 33/286 |
| 2005/0040817 A1 | 2/2005 | Clauss et al. | |

FOREIGN PATENT DOCUMENTS

| | | |
|---|---|---|
| JP | 2002-062105 A | 2/2002 |
| WO | WO-03/073131 A1 | 9/2003 |

OTHER PUBLICATIONS

Invitation to Pay Additional Fees mailed Jun. 6, 2005, for PCT Application No. PCT/US2005/004587 filed Feb. 11, 2005, four pages.

* cited by examiner

*Primary Examiner*—Vincent Q. Nguyen
(74) *Attorney, Agent, or Firm*—Morrison & Foerster LLP

(57) ABSTRACT

A sensor such as a stud sensor having a capacitor plate coupled with a spring to a head to provide a floating head. In other versions, the sensor has an on-switch coupled between a head and a body of a sensor; a head detachable from a body of the sensor; a marking instrument coupled with a lever to a body of a sensor; and a body having one or more low compression and/or low resistance slider pads.

20 Claims, 9 Drawing Sheets

STUD SENSOR WITH FLOATING HEAD

CROSS-REFERENCE TO RELATED APPLICATIONS

This application claims priority to provisional application Ser. No. 60/551,857, filed Mar. 9, 2004, titled "SENSOR" by Norman L. KRANTZ.

BACKGROUND OF THE INVENTION

1. Field of the Invention

This invention relates to an electronic sensor and, in particular, to a sensor suitable for detecting the location of an object, such as wall studs, behind a variety of surfaces, including walls, floors and other non-electrically conductive structures.

2. Description of the Prior Art

U.S. Pat. No. 4,464,622 titled "Electronic wall stud sensor" by Robert C. FRANKLIN, issued Aug. 7, 1984, and incorporated in its entirety by reference herein, discloses an electronic wall stud sensor particularly suitable for locating a stud positioned behind a wall surface. A "stud" is a structural member of a building to which an interior wall surface such as wall board or paneling is affixed. Typically in the U.S., "2-by-4" wooden studs are used in construction. Nominally, a 2-by-4 stud is 51 mm (2 inches) wide and 102 mm (4 inches) deep and of any suitable length. The actual dimensions of a 2-by-4 are more typically 38 mm (1½ inches) wide and 89 mm (3½ inches) deep. Use of English (inches) units and U.S. stud sizes here is in conformance with U.S. construction practice and is not intended to be limiting, but is only illustrative. Finding studs is a typical problem for building repairs, picture hanging, etc.

The sensor detects the stud by measuring a change in capacitance due to a change in the dielectric constant along the wall. Due to the placement of the studs, a wall exhibits differing dielectric constants while the sensor is moved along the wall surface. The sensor includes a plurality of capacitor plates, a circuit for detecting changes in the capacitance, and an indicator.

The plurality of capacitor plates is mounted in the sensor such that they can be positioned close to a wall's surface. When the capacitor plates are drawn along the surface, the circuit detects a change in the capacitance of the plates due to a change in the average dielectric constant of the surface. The capacitor plates are used to measure the effective capacitance or change in capacitance of a wall. Before detection begins, the sensor first performs a calibration to null out the effect of a wall in the absence of a stud. The capacitor plates are composed of a center plate and a symmetric pair of electrically connected edge plates. The difference in capacitance between the center and edge plates is used to determine the location of the edge of a stud. The centerline of the stud is then determined by finding both the left and right edges of the stud and then measuring to the middle of the distance between the edges. Thus, multiple measurements must be made in order to determine the centerline of the stud. The indicator indicates the change in capacitance of the capacitor plate, thereby alerting an operator to the wall stud position. The indicator also alerts the operator when calibration is occurring.

While this procedure is effective in determining the centerline of a stud, significant errors in determining the location of the stud's edges can occur. One factor is the depth of the stud behind the surface. Due to the thickness of the sheetrock (also referred to as gypsum wall board and which has a thickness of 16 mm or equivalently ⅝ of an inch) or other wall surface material, a "ballooning effect" may distort the perceived width of the stud. The closer a stud is positioned to the surface, the wider the stud will appear when sensed in this way. Similarly, the farther or deeper a stud is positioned, the narrower the stud will appear. This ballooning effect is exacerbated when the sensitivity of the sensor is increased to aid in detecting deeper studs. The ballooning may be asymmetric due to electrical wires, metallic pipes and other objects in close proximity to the stud, which in turn may lead to a reduced ability to accurately determine a stud's centerline. In the case of extreme ballooning, location of an edge of a stud can be inaccurately indicated by as much as 51 mm (2 inches). Similarly, the centerline of the stud may be so inaccurately indicated that it is completely off the actual stud location.

A first method of compensating for the ballooning effect is shown in U.S. Pat. No. 6,023,159, titled "Stud sensor with dual sensitivity" by Charles E. HAGER issued Feb. 8, 2000, and incorporated by reference herein in its entirety. Unfortunately, using a dual sensitivity control only partially minimizes the ballooning effect.

A second method of compensating for the ballooning effect is shown in U.S. Pat. No. 5,917,314, titled "Electronic wall-stud sensor with three capacitive elements" by Charles E. HAGER et al. issued Jun. 29, 1999, and incorporated by reference herein. This second method discloses using three parallel sensing plates and using sums and differences between the various plate capacitances to determine the centerline and edges of a stud.

Additionally, capacitor plates and associated circuitry of a sensor may result in an inaccurate calibration and produce erroneous measurements if the capacitor plates are not flush against a surface under test. For example, many known capacitive sensors have a push button switch that an operator depresses and holds down to turn on the sensor. If an operator depresses the push button switch while moving the sensor towards the wall, the capacitor plates of the sensor will not be against the wall during the calibration process. In this case, the capacitor plates are farther from the wall during calibration than during use.

Other times an operator pushes the device harder against a wall during calibration but lets up-on the device when sliding it from side to side. In this case, the capacitor plates are closer to the wall during calibration than during use.

Some times an operator does not smoothly slide a sensor when moving it from side to side. That is, the operator may lift or rock the sensor thereby causing the capacitor plates to change in distance from the wall and/or to become non-parallel with the wall.

Known sensors also are fixed in functionality. A stud sensor only detects features of studs. An AC sensor only detects the presences of alternating current. A metal sensor only detects metal. To perform several functions, an operator needs several separate tools, each with its own power supply and look and feel.

Some known sensor devices include a semi-permanent marking mechanism. For example, some sensor devices include a mechanical pricking assembly that make a physical depression or hole in a surface.

The above methods, which use electronic wall stud sensors, are unable to reliably and accurately sense an edge of a stud (or other structural member) through surfaces that are thicker than 38 mm (1½ inches). Additionally, these sensors, if overly sensitive, falsely indicate the presence of non-existing studs. Therefore, known sensors have disadvantages.

SUMMARY

In some embodiments of the present invention, capacitor plates of a sensor head are coupled to a sensor housing using springs thereby providing a floating head. The springs may be coiled springs, leaf springs, lever arm springs or the like. Some embodiment provide a floating head capacitive sensor comprising: a head including at least one capacitive plate and adapted to be placed on a surface to detect structures behind the surface; a body; and a tension assembly coupling the head to the body.

In some embodiments of the present invention, tension placed on a capacitor plate of a sensor trips a switch to power the sensor. Some embodiments provide an on-detect capacitive sensor comprising: a head including at least one capacitive plate and adapted to be placed on a surface to detect structures behind a surface; a body coupled to the head; and an on-off switch sensitive to a relative position between the head and the body, wherein the on-off switch couples electrical power from the body to the head when the relative position is within a predetermined range of positions.

In some embodiments of the present invention, a head of the sensor is detachably replaceable from the body of the sensor. Some embodiments provide a modular sensor comprising: a body including a housing and a battery in the housing; and a head assembly including functions having at least one of: a sensor to detect a change in capacitance (stud sensor), a sensor to detect presence of alternating current (AC sensor), a sensor to detect the presence of a conductor (metallic sensor), a sensor to measure distance (distance sensor), a laser light source, and a laser light source emitting a self-leveling pattern; wherein the head assembly is electrically and mechanically detachably coupled to the body.

In some embodiments of the present invention, the sensor includes a surface marking instrument. Some embodiments provide a marking sensor comprising: a body; a capacitor plate coupled to the body; a guiding assembly mounted to the body; a marking instrument extendably coupled to the guiding assembly; and a lever coupled to the marking instrument; wherein activating the lever extends the marking instrument.

In some embodiments of the present invention, the sensor includes low friction and/or low compression sliders. Some embodiments provide a low-resistance sliding sensor comprising: a housing adapted to be placed on a surface to detect structures behind the surface; a capacitor plate coupled to the housing; and one or more pads on an exterior surface of the housing that bears against the surface, wherein the pads are selected from a group consisting of: a TEFLON® material; Ultra High Molecular Weight (UHMW) plastic; a DELRIN® material; nylon; and polyethylene.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

FIGS. 1A–1E and 2A–2B show side views of various embodiments of a sensor having floating capacitor plates, in accordance with the present invention.

Figure 1A:
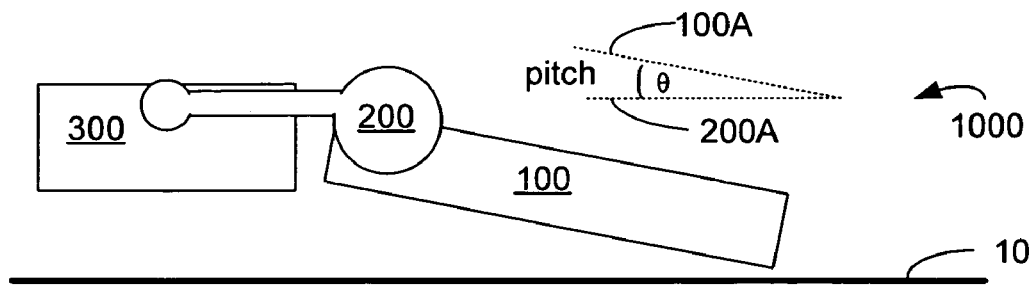
FIGS. 1A–1H and 2A–2B show side views of various embodiments of a sensor having floating capacitor plates, in accordance with the present invention.

FIGS. 1A–1H show a series of side views of a sensor 1000 being placed against a surface, such as a wall 10. FIG. 1A shows sensor 1000 having capacitor plates in a head 300 attached to a body assembly 100 via tension assembly 200. Tension assembly 200 may provide one or more of tension, coupling, detachability, movement and pivoting. Tension assembly 200 may include one or more tension bars, coiled springs and flexible members.

Tension assembly 200 may provide detachable coupling between head 300 and body assembly 100. For detachable coupling, tension assembly 200 may utilize a ball and socket assembly, a pair of magnets or other coupling mechanism that allows detachability. In addition to mechanical coupling, the detachable coupling may also provide electrical coupling. For example, body 100 may house a battery and head 300 may house circuitry needing power.

Tension assembly 200 may allows some movement and/or pivoting. For example, tension assembly 200 may allow movement and/or pivoting at interface points. Alternatively, tension assembly 200 may rigid interconnection between the tension assembly 200 and body assembly 100, and between tension assembly 200 and head 300, but allow flexibly and pivoting within the tension assembly 200. The movement and/or pivoting point or points may be at one or more of the interfaces between tension assembly 200 and body assembly 100, and between tension assembly 200 and head assembly 300. Movement may be in one or more of the Cartesian directions (up/down, left/right, backwards/forwards). Pivoting may be in one or more of the angular directions (pitch, yaw, roll). For example, tension assembly 200 may provide tension to correct both pitch and roll misalignments.

In the embodiment shown, tension assembly 200 may be detachable coupled to head 300 using a coupling that provides Cartesian and angular displacement. Tension assembly 200 may also provide angular and/or downward tension to body 100. For example, an interface between tension assembly 200 and body 100 may have a coiled spring to provide angular tension between tension assembly 200 and body 100. The angular tension may be applied to head 300 via tension assembly 200.

In FIG. 1A, sensor 1000 is shown positioned at a distance away from wall 10. The tension assembly 200 causes a force between head 300 and body 100 when head 100 encounters physical resistance. Sensor 1000 may produce pitch and roll angles (shown as θ in FIGS. 1A–1H) between slope 100A of body 100 and slope 200A of tension assembly 200. If the detachable coupling allows for a small amount of movement, angle θ is approximately equal to the angle between head 300 and body 100.

Figure 1B:
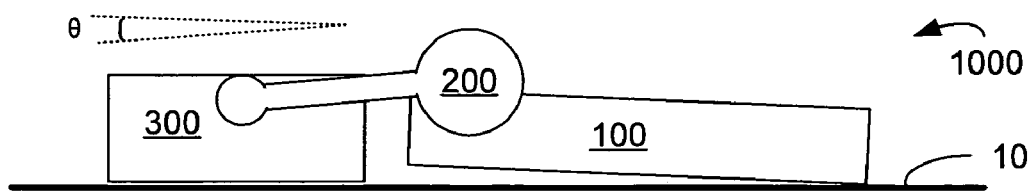
Figure 1C:
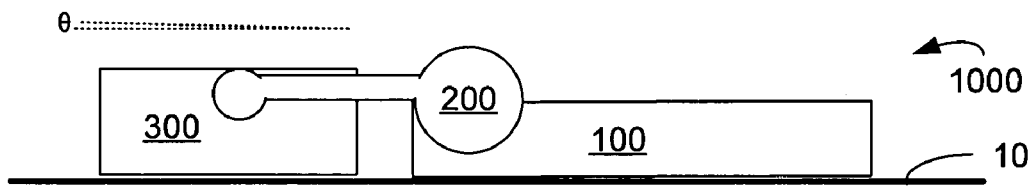
Figure 1D:
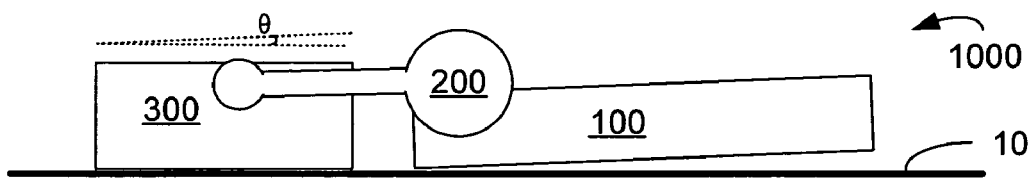

In FIG. 1B, head 300 makes contact with wall 10. As sensor 1000 is pressed against wall 10, body 100 will also make contact with wall 10 as shown in FIG. 1C. Once body 100 and head 300 contact wall 10, a pitch angle θ defined body 100 and head 300 will decrease to approximately zero. Even when body 100 rocks away from or is not flush with wall 10 as shown in FIGS. 1B and 1D, head 300 remains flush with wall 10.

FIGS. 1E–1H show similar flexibility between head 300 and body 100 from a side view rotated 90 degrees from the side view shown in FIGS. 1A–1D. For clarity, tension assembly 200 is not shown, partially hidden head assembly 300 is shown with dotted lines, and body 100 is shown with solid lines.

Figure 1E:
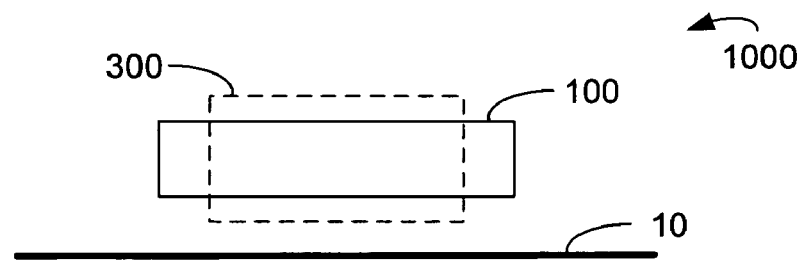
Figure 1F:
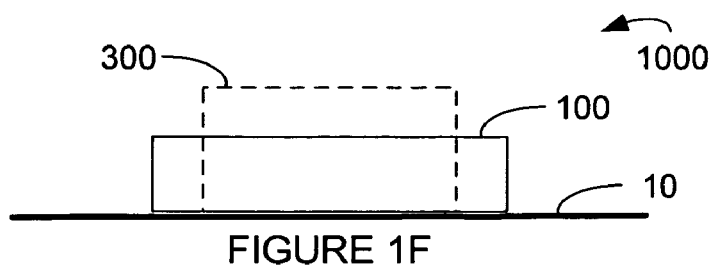
Figure 1G:
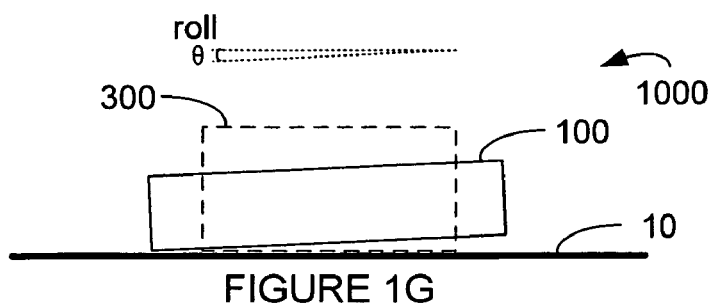
Figure 1H:
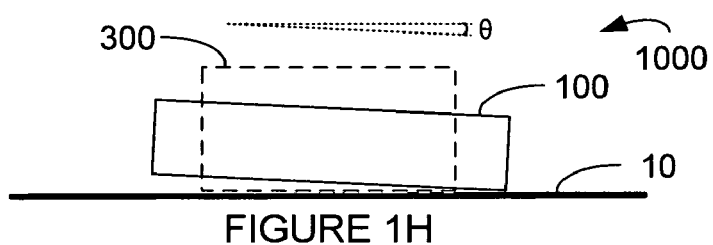

FIG. 1E shows sensor 1000 is shown positioned at a distance away from wall 10. In FIG. 1F, body 100 and head 300 are flush against wall 10. In FIG. 1G, body 100 is rocked at a roll angle θ relative to the head 300. Tension assembly 200 (not shown) holds head 300 flush against wall 10 even though body 100 is not flush against wall 10. Similarly in FIG. 1H, body 100 is rocked in the opposite direction at an angle θ relative to the head 300. Again, tension assembly 200 (not shown) holds head 300 flush against wall 10.

In some embodiments of the present invention, tension placed on a capacitor plate trips a switch to power the sensor. For example, an angle threshold sensor or a displacement sensor may sense the pitch angle or distance between a-body and a head of a sensor. When the angle (shown as θ in FIGS. 1A–1D) is greater than a threshold angle, power is disengaged from the sensor. The switch may be located about pivot axis between tension assembly 200 and body 100 of FIGS. 1A–1D. When the angle θ is less than or equal to the threshold angle, power is supplied to the sensor.

For example, when an angle threshold sensor measures an angle greater than 5 degrees, power is not supplied to the sensor. When the angle threshold sensor measures an angle less than 5 degrees, power is supplied to the sensor. Alternatively, a threshold angle may be configured other angles such as 4, 3, 2 or 1 degree within a half degree tolerance.

Once power is supplied to the sensor, calibration may begin. By powering the sensor only after the angle is substantially close to zero, for example within a few degrees of zero, calibrating the sensor occurs after the capacitor plates are properly positioned. Advantageously, calibration does not occur while the capacitor plates are at a distance away from the surface.

The mechanical interface between head 300 and body 100 may allow for the angle between the body and head to operate within a range of positive and negative angles. That is, angle θ may range between a positive angle and a negative angle, for example, ±5 degrees.

Figure 2A:
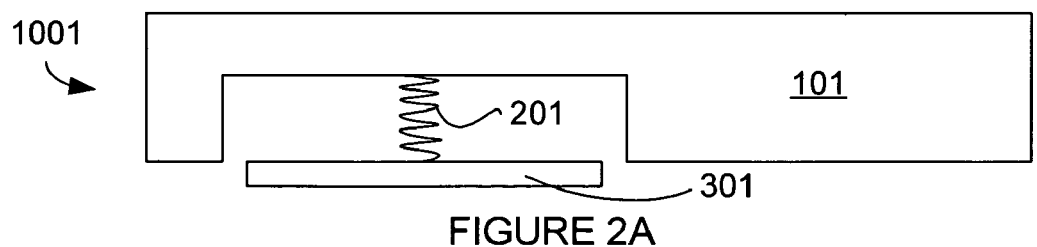
Figure 2B:
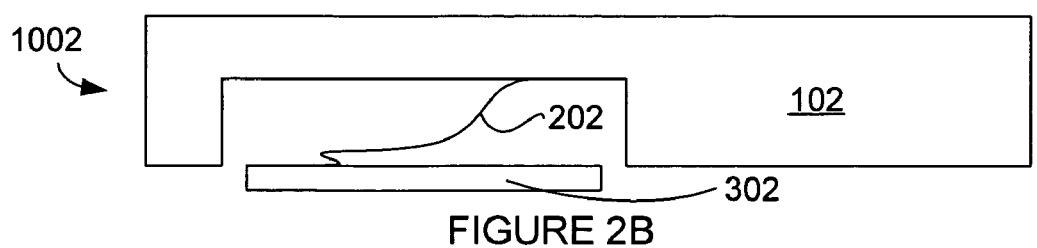

FIGS. 2A–2B show other embodiments of a sensor 1001, 1002 having a head 301, 302 including a capacitor plate attached to a body 101, 102 with a spring mechanism 201, 202. Spring mechanism 201 may be one or more coiled springs. Spring mechanism 202 may be a leaf spring or other type of spring. Spring mechanism 201 may or may not be detachably connected and may or may not provide a path for power transfer between body 100 and head 300.

Tension assembly 200 (FIGS. 1A–1D) and spring mechanisms 201, 202 (FIGS. 2A–2B) provide a force to press the capacitor plates of a sensor against a wall (or other surface) even while the operator may not be providing a constant pressure to the body 100, 101, 102 of the sensor. By providing near constant pressure to the head 300, 301, 302, the capacitor plates are held against the wall at a uniform distance.

Figure 3A:
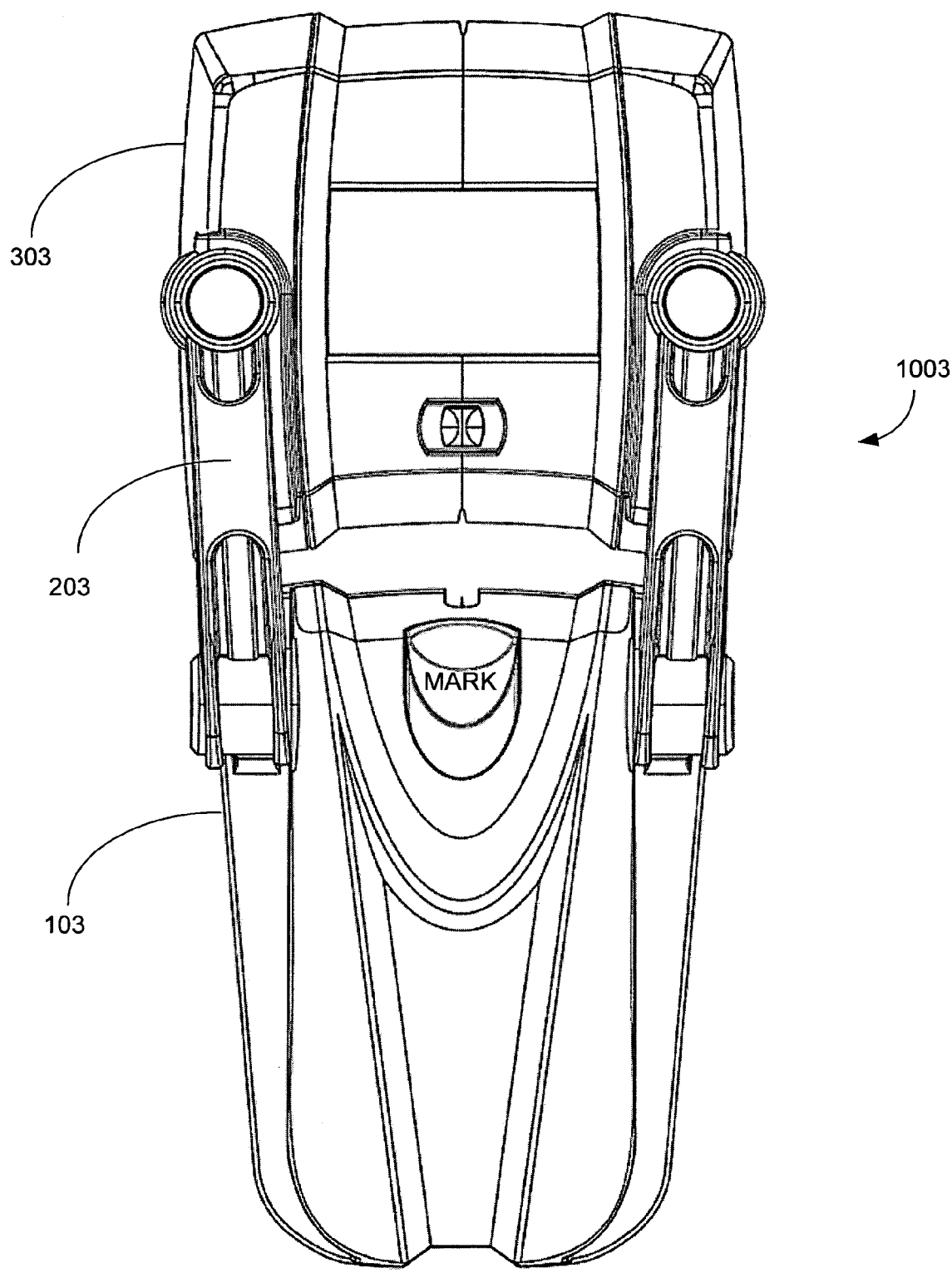
FIGS. 3A–3C show top views of an embodiment of a sensor having a detachable head and floating capacitor plates, in accordance with the present invention.
Figure 3B:
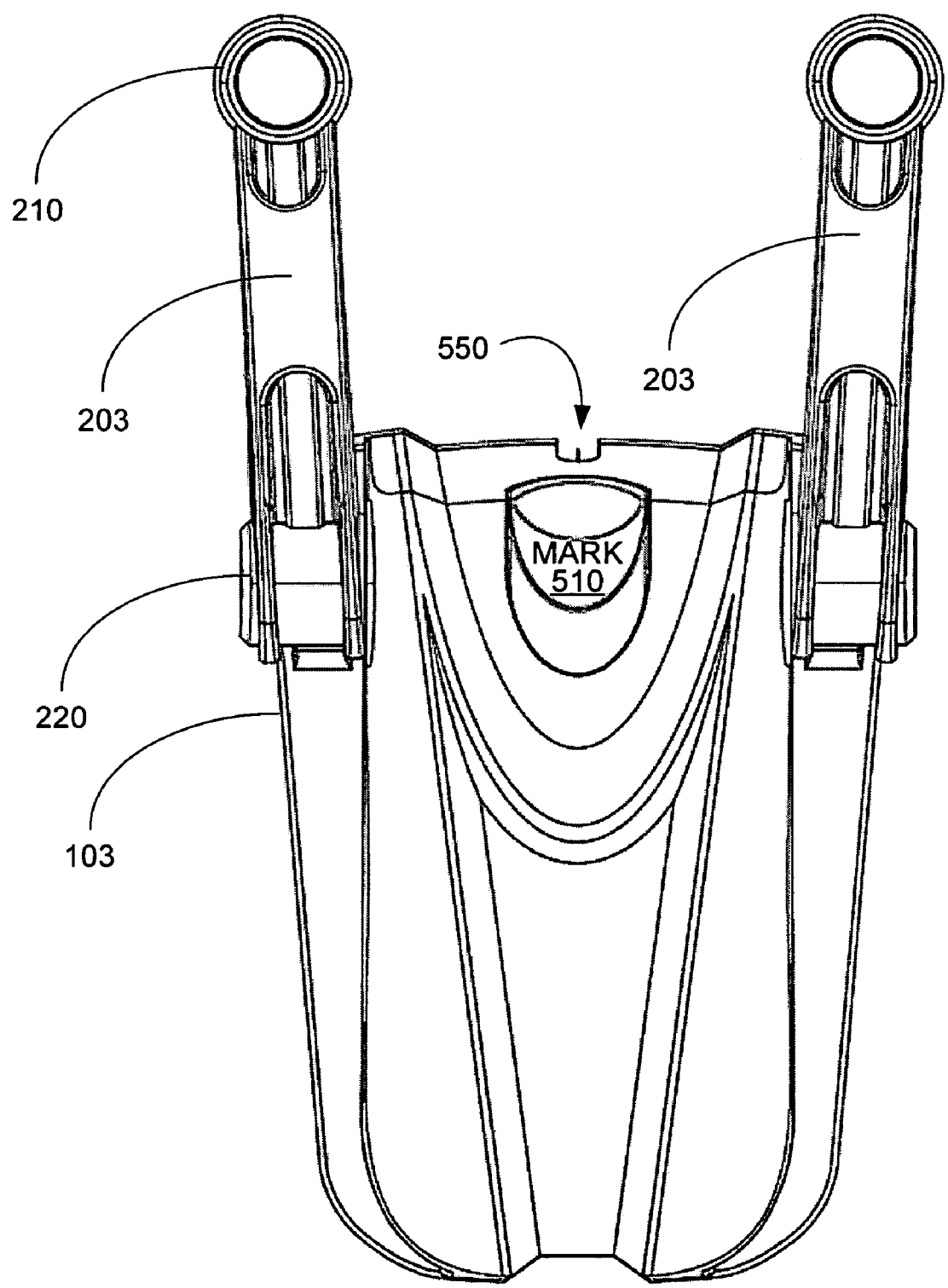
Figure 3C:
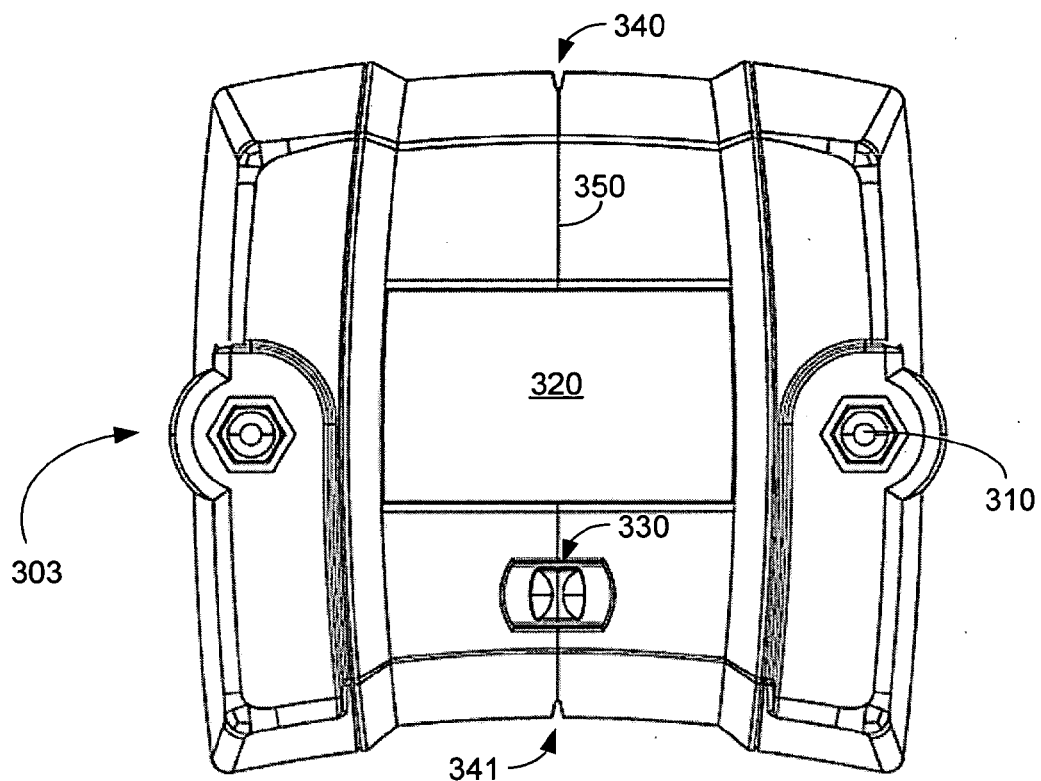

FIGS. 3A–3C show top views of a variation of the embodiment of a sensor 1003. Sensor 1003 has a detachable and floating head, in accordance with the present invention. FIG. 3A shows sensor 1003 having a head 303, which includes capacitor plates (not shown), a body 103 and tension arms 203.

The body 103 may include a battery and may provide power to the head 303 via electrical connections in the tension arms 203. For example, a reference ground may be provided via a first tension arm 203 and a voltage level may be provided via a second tension arm 203. A first ball and socket assembly between the first tension arm 203 may be used as one electrical connection and a second ball and socket assembly between the second tension arm 203 may be used as a second electrical connection. The balls may allow conductive whipping contact even while providing rotational and/or Cartesian movement in the coupling. Alternatively, a separate plug and socket may provide electrical connections between the battery in the body and circuitry in the head. Alternatively, the head and body may be formed into a unified housing.

Tension arms 203 may also provide mechanical support to hold head 303 against a wall 10 (see FIGS. 1A–1D) even while the operator is (undesirably) slightly rocking or mispositioning body 103. Additionally, this embodiment may also allow head assembly 303 to be quickly detached and reattached or replaced. A re-attachable interface between body 103 and head 303 allows a single body 103 to work with various head assemblies.

Some head assemblies may provide one or more of the following features: a sensor to detect a change in capacitance (stud sensor), a sensor to detect a presences of alternating current (AC sensor), a sensor to detect the presence of a conductor (metallic sensor), a sensor to measure a distance (distance sensor), a laser light source, and a laser light source emitting a self-leveling pattern. Additionally, a head assembly may be replaced with a similar but upgraded head assembly.

A modular system having either a replaceable head and/or a-replaceable body allows for more cost effective and flexible sensors. For example, an operator can use a single body with any one of multiple interchangeable heads that the operator owns rather than requiring multiple separately functioning sensors for each task. Additionally, a common body may allow an operator to have a single recharging station or a single set of batteries to replace rather than having multiple stations or sets of batteries.

FIG. 3B shows a sensor body 103 with tension arms 203 detached from a head assembly (not shown). Body 103 may include a marking mechanism with a mark button 510 and a marking point 550 (described with reference in FIGS. 5A–D below). Tension arms 203 may each include a shoulder assembly 220, which provides angular tension between tension arm 203 and body 103. Tension arms 203 may also include a detachable interface 210, such as a ball receptacle.

FIG. 3C shows head assembly 303 detached and separate from tension arms 203 and body 103. Head 303 may include a complimentary detachable interface 310, such as a post and ball structure, designed to detachably connect to interface 210 (FIG. 3B). Head 303 may also include an indicator or display 320, such as an LCD display or LED indicators. Head 303 may also include a mode switch 330 to provide user selectable functionality, such as a selection between deep and normal scanning. Head 303 may also include a spot light aperture 340 for directing a light away from the sensor and towards a wall when a feature (such as a stud) is detected. Additionally, head 303 may also include a second spot light aperture 341 for directing a light against the wall and towards the body or a marking mechanism. Light from spot light apertures 340 and 341 may be directed along a center reference line 350 indicated on head 303.

Figure 4A:
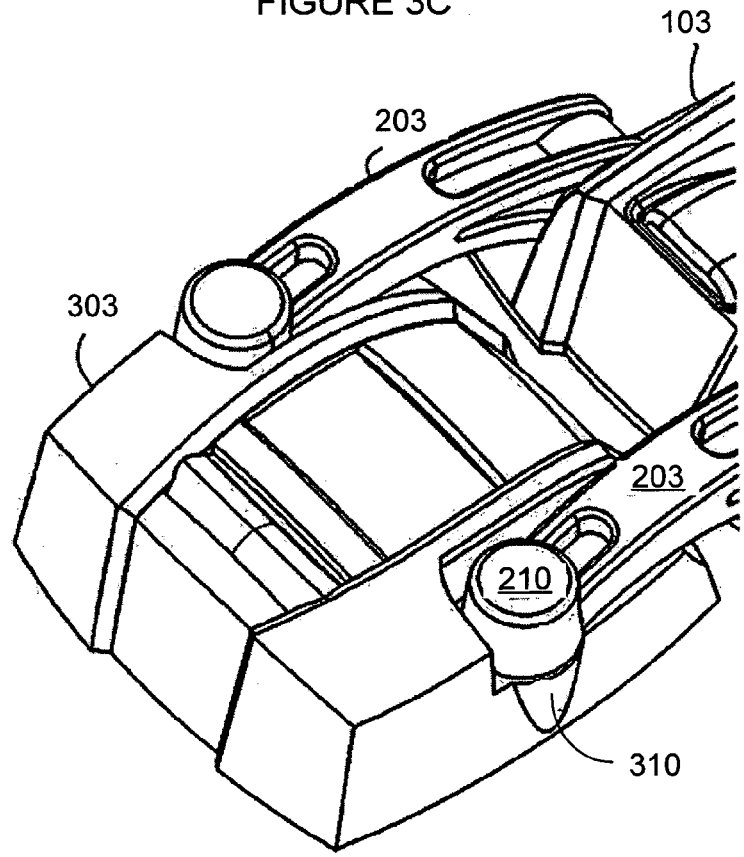
FIGS. 4A–4C show an interface between a head assembly and a body assembly, in accordance with the present invention.
Figure 4B:
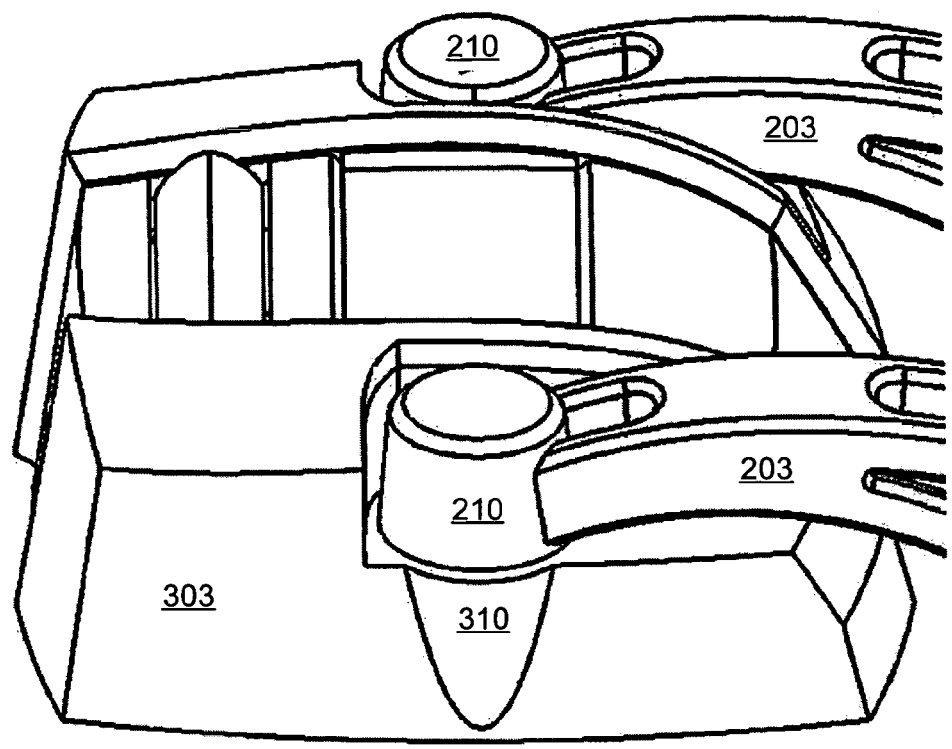
Figure 4C:
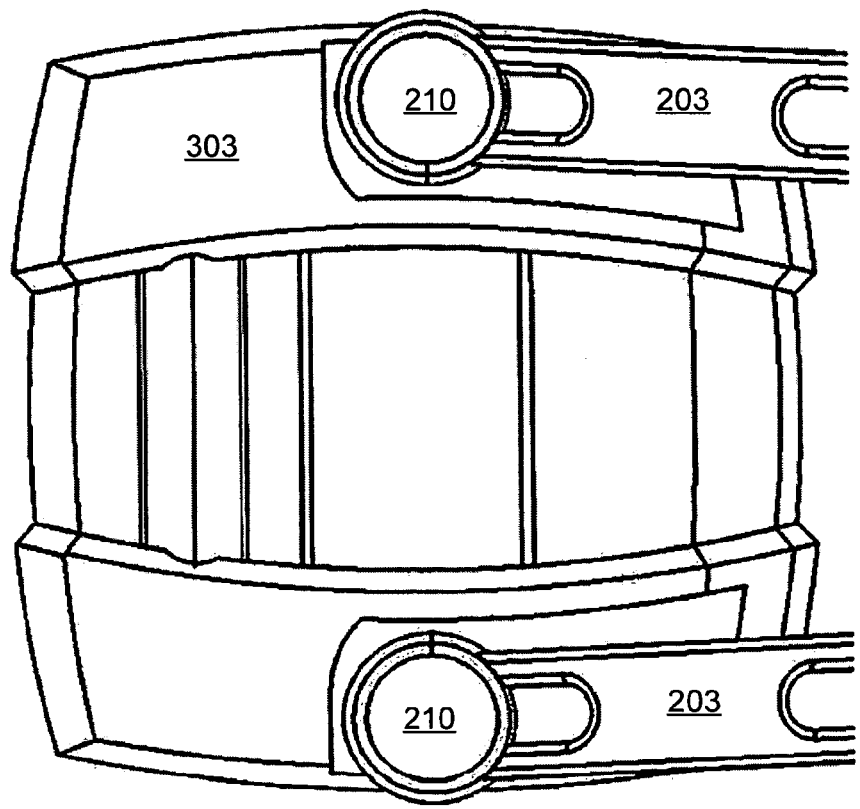

FIGS. 4A–4C show various views of an interface between a head assembly 303 and a body assembly 103, in accordance with the present invention. Tension assembly 203 may be tension bars and may allow head 303 to be detached from the body 103. For example, a connector comprising a first part 210 of a fastener may be part of Tension assembly 203 and a second part 310 of a fastener may be part of head 303. The fastener may allow angular and/or lateral movement of head 303 relative to body 103. The fastener may be a pair of magnets, snaps, a ball and socket assembly, a VELCRO® material (hook and loop-type fastener) or other known fasteners. Some fasteners provide a pivot axis allowing the head to pivot about a line or point. Pivoting allows head 303 to be held in a position substantially parallel to a wall or other surface even when an operator lifts or rocks body 103.

In alternative embodiments, a tension assembly may include a single pivoting connection. Alternatively, a tension assembly may provide two pivoting connections to a head with each pivoting connection coupled to an independent rotational interface to a body (as shown above). The pivoting connection(s) may be placed to the left and right sides of the head (as shown above) or may be placed to the top and bottom or other convenient location(s) on the head.

FIGS. 5A–5D show a marking mechanisms 500, 501 for use in a sensor, in accordance with the present invention. The marking mechanism 500, 501 may be formed in the body 103 of sensor 1003 (shown in FIGS. 3A and 3B).

Figure 5A:
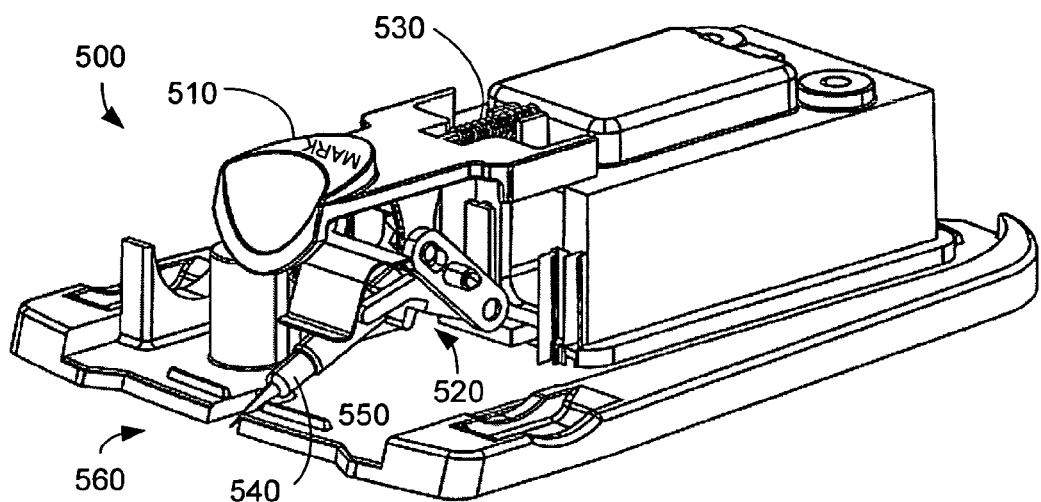
FIGS. 5A–5D show a marking mechanism in a sensor, in accordance with the present invention.
Figure 5B:
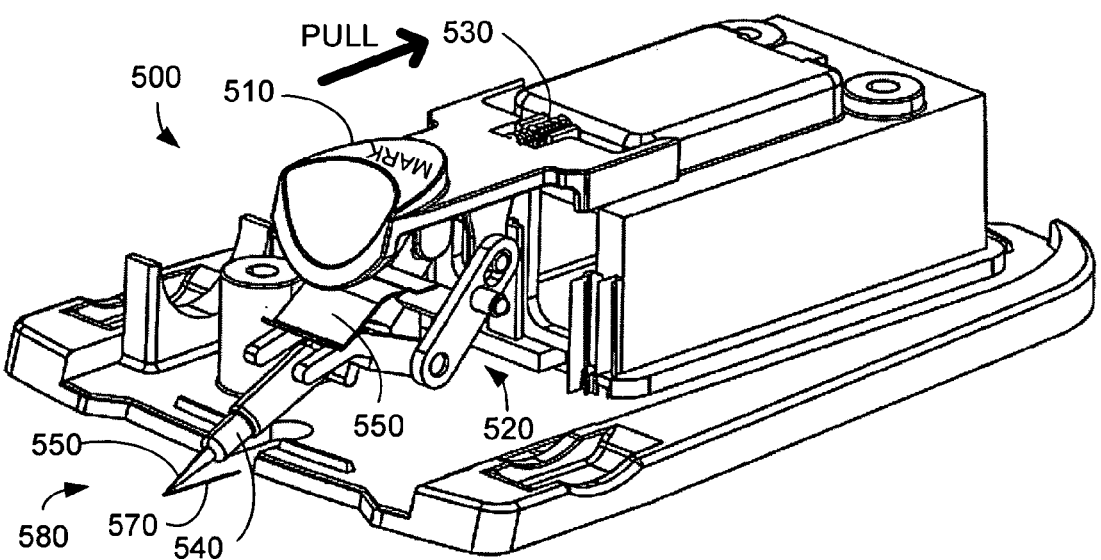

FIGS. 5A and 5B show perspective views of the marking mechanism 500 in a retracted state 560 and a extended state 580, respectively. Marking mechanism 500 allows an operator to pull a mark button 510, which compresses a spring 530 and engages a lever assembly 520 to extend scribing instrument 540 having a marking point 550 against a wall. As the marking mechanism transitions from the retracted state 560 and the extended state 580, a leaf spring 550 pressures scribing instrument 540 towards the wall thereby allowing the extending marking point 550 to draft a line 570 on the wall.

Figure 5C:
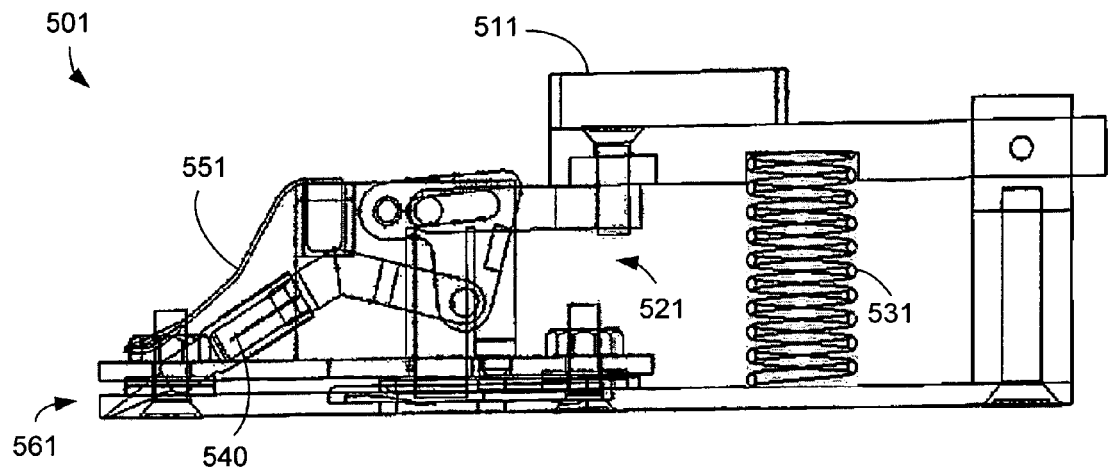
Figure 5D:
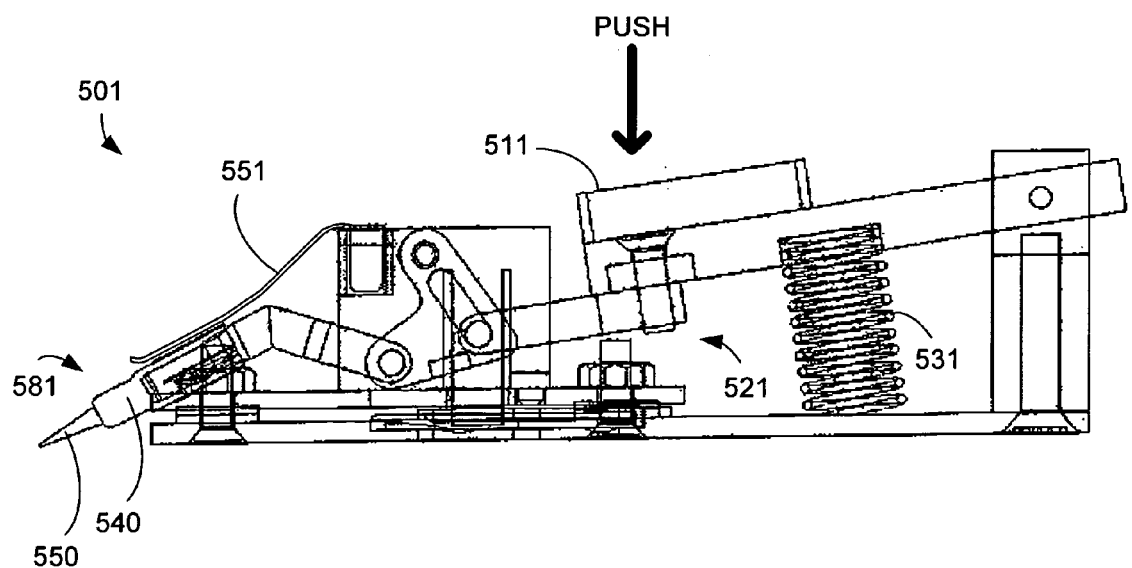

FIGS. 5C and 5D show side views, respectively, of a second marking mechanism 501 in the retracted state 560 and an extended state 580, respectively. Marking mechanism 501 allows an operator to push a mark button 510, which similarly compresses a spring 531 and engages a lever assembly 521 to extend scribing instrument 540 having a marking point 550 against a wall. Again, as the marking mechanism transitions from the retracted state 560 and the extended state 580, a leaf spring 551 pressures scribing instrument 540 towards the wall thereby allowing the extending marking point 550 to create a short line 570 on the wall.

In some embodiments, the series of lever arms, springs, and scribing instrument make a mark approximately 6 mm (¼ of an inch) along the wall. In some embodiments, the lever assembly may include a guiding assembly having a cam or track. The scribing instrument 540 may be a pencil tip, an ink marker or the like. Using a pencil tip as scribing instrument 540 has the added advantage of being erasable and non-permanent or destructive to the wall. Additionally, a scribing instrument 540 that extents forward from the sensor allows an operator to at least partially view the marking point 550 as it creates a mark on the wall.

Figure 6A:
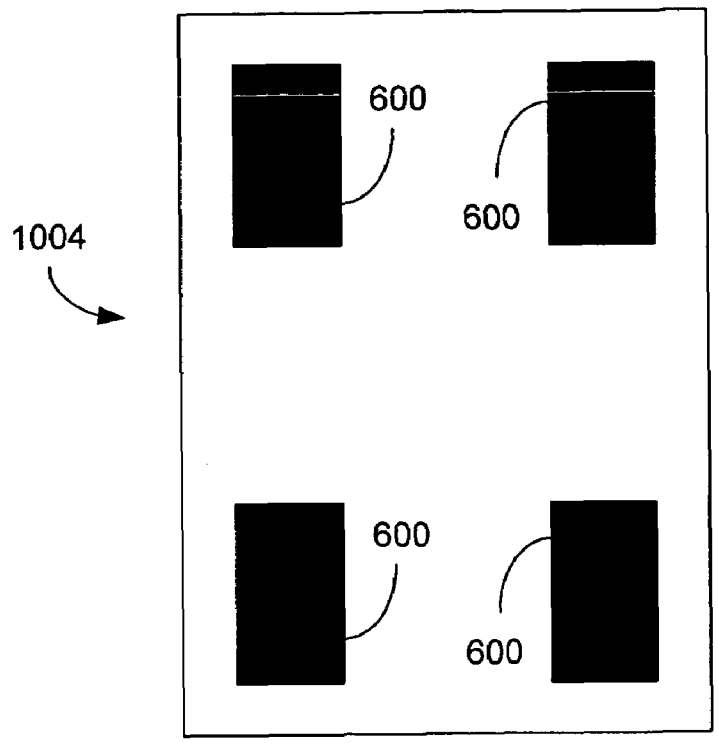
FIGS. 6A–6B show sliders on the wall-side of a sensor.
Figure 6B:
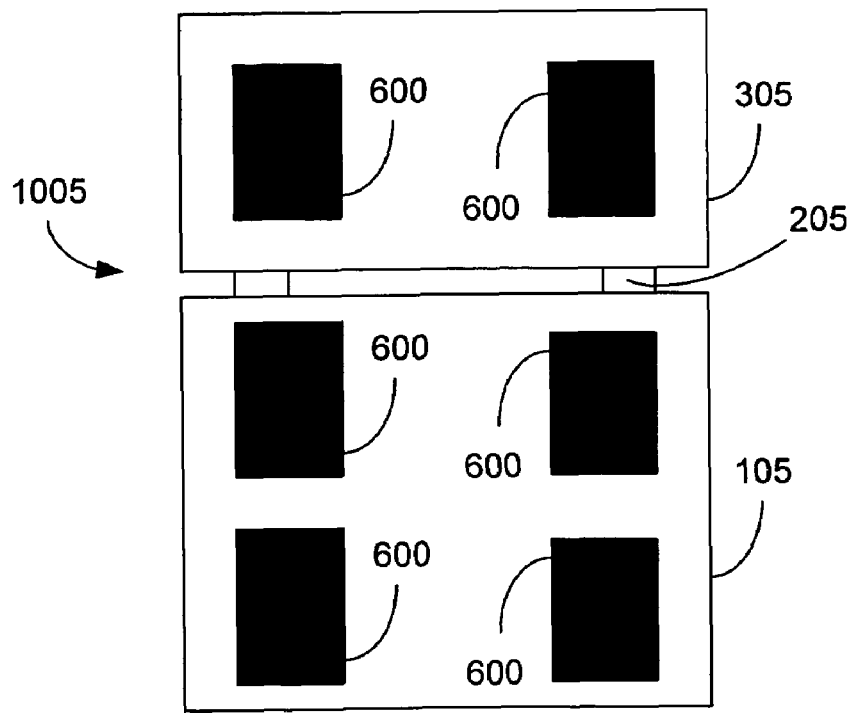

FIGS. 6A–6B show sliders 600 on the wall-side surface of a sensor 1004, 1005. FIG. 6A shows a sensor 1004 formed in a single body with multiple sliders 600. FIG. 6B shows a sensor 1005 including a head assembly 305 and a body assembly 105 coupled with a pair of tension arms 205. Both head 305 and body 105 have sliders 600.

Known sliders are made of a material such as a VELCRO® material, which is compressible and forms a coefficient of friction against a wall. Sliders 600 of the present invention are instead of a material having a lower coefficient of friction and/or a lower coefficient of compression than a VELCRO® material. For example, sliders 600 may be comprised of a TEFLON® material, an Ultra High Molecular Weight (UHMW) plastic, a DELRIN® material, nylon or polyethylene.

A slider 600 having a lower coefficient of kinetic friction than a VELCRO® material allows the sensor to be dragged along a wall with reduced choppiness, thereby keeping the capacitor plates at a more steady distance from the wall. Additionally, a lower coefficient of static friction (such as provided by TEFLON® material or other slider material) allows an operator more easily move the sensor a small amount without a feeling of the jerking sensation that a VELCRO® material provides.

A slider 600 having a lower coefficient of compression than a VELCRO® material advantageously allows calibration and sliding to each occur with the capacitor plates at a more steady distance from the wall. Additionally, a slider 600 having a lower coefficient of compression aids in reducing rocking by an operator.

While the invention has been described in terms of particular embodiments and illustrative figures, those of ordinary skill in the art will recognize that the invention is not limited to the embodiments or figures described.

For example, many of the embodiments described above provide for detachability between a head and body. In other embodiments, a head and body are formed into a common shell housing. In some embodiments, a head is positioned by controlling pitch and yaw, while in other embodiments low friction/low compression sliders alone or in combination with pitch/yaw controls assist in properly positioning a head. In some embodiments, a protruding marking instrument is visible to an operator.

In some embodiments, multiple features described above are combined into a single sensor. Some embodiments include one or more of the following features: low friction sliders, low compression sliders, detachable head and body, a floating head, a displacement-detect on-off switch, marking device using a pencil tip, and marking device that is visible when extended and in use. Some embodiments combine two or more of these features.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

I claim:

1. A floating head capacitive sensor comprising:
   a head including at least one capacitive plate and adapted to be placed on a surface to detect structures behind the surface;
   a body; and
   a tension assembly coupling the head to the body wherein the tension assembly includes a spring adapted to provide rotational tension.

2. The floating head capacitive sensor of claim 1, further comprising a fastener which couples the tension assembly to one of the head and the body.

3. The floating head capacitive sensor of claim 2, wherein the fastener provides mechanical and electrical coupling between the head and the body.

4. The floating head capacitive sensor of claim 2, wherein the fastener allows angular rotation of the head relative to the body.

5. The floating head capacitive sensor of claim 2, wherein the fastener allows lateral movement of the head relative to the body.

6. The floating head capacitive sensor of claim 2, wherein the fastener includes a ball and socket.

7. The floating head capacitive sensor of claim 2, wherein the fastener includes a pair of magnets.

8. The floating head capacitive sensor of claim 1, further including a coupling between the tension assembly and one of the head and the body, wherein the coupling provides angular tension between the tension assembly and the one of the head and the body.

9. The floating head capacitive sensor of claim 1, wherein the tension assembly further includes a detector adapted to detect an indication of tension.

10. The floating head capacitive sensor of claim 1, further comprising an on-off switch sensitive to a relative position between the head and the body, wherein the on-off switch couples electrical power from the body to the head when the relative position is within a predetermined range of positions.

11. The floating head capacitive sensor of claim 1, wherein:
    the body includes a housing and a battery in the housing;
    the head assembly includes functions having at least one of:
       a sensor to detect a change in capacitance (stud sensor),
       a sensor to detect presence of alternating current (AC sensor),
       a sensor to detect the presence of a conductor (metallic sensor),
       a sensor to measure distance (distance sensor), and
       a laser light source, and a laser light source emitting a self-leveling pattern; and
    the head assembly is electrically and mechanically detachably coupled to the body.

12. The floating head capacitive sensor of claim 1, further comprising:
    a guiding assembly mounted to the body;
    a marking instrument extendably coupled to the guiding assembly; and
    a lever coupled to the marking instrument;
    wherein activating the lever extends the marking instrument.

13. The floating head capacitive sensor of claim 12, wherein the marking instrument is visible when the marking sensor is in position against a surface and the marking instrument is in an extended position.

14. The floating head capacitive sensor of claim 12, wherein the marking instrument includes a tip for providing an erasable marking.

15. The floating head capacitive sensor of claim 1, further comprising one or more pads on an exterior surface of at least one of the head and body that bears against the surface, wherein the pads are selected from a group consisting of:
    a TEFLON® material;
    Ultra High Molecular Weight (UHMW) plastic;
    a DELRIN® material;
    nylon; and
    polyethylene.

16. The floating head capacitive sensor of claim 15, wherein the capacitor plate and the body are detachably coupled.

17. A floating head capacitive sensor comprising:
    a head including at least one capacitive plate and adapted to be placed on a surface to detect structures behind the surface;
    a body; and
    a tension assembly coupling the head to the body; further comprising:
    a fastener which couples the tension assembly to one of the head and the body; and
    a coupling between the tension assembly and the other one of the head and the body, wherein the coupling provides tension between the head and the body when the head and body have pressure contact with the surface.

18. A floating head capacitive sensor comprising:
    a head including at least one capacitive plate and adapted to be placed on a surface to detect structures behind the surface;
    a body; and
    a tension assembly coupling the head to the body; wherein the head and body are detachably coupled by the tension assembly.

19. A floating head capacitive sensor comprising:
    a head including at least one capacitive plate and adapted to be placed on a surface to detect structures behind the surface;
    a body; and
    a tension assembly coupling the head to the body; wherein the tension assembly includes a tension arm.

20. A floating head capacitive sensor comprising:
    a head including at least one capacitive plate and adapted to be placed on a surface to detect structures behind the surface;
    a body; and
    a tension assembly coupling the head to the body; wherein the tension assembly includes a pair of tension arms.

* * * * *